US011170205B2

(12) United States Patent
Huang et al.

(10) Patent No.: US 11,170,205 B2
(45) Date of Patent: Nov. 9, 2021

(54) IN-CELL FACIAL RECOGNITION DISPLAY PANEL, METHOD AND LIQUID CRYSTAL DISPLAY

(71) Applicant: WUHAN CHINA STAR OPTOELECTRONICS TECHNOLOGY CO., LTD., Hubei (CN)

(72) Inventors: Yaoli Huang, Hubei (CN); Xinglong He, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 472 days.

(21) Appl. No.: 16/304,545

(22) PCT Filed: Sep. 26, 2018

(86) PCT No.: PCT/CN2018/107649
§ 371 (c)(1),
(2) Date: Nov. 26, 2018

(87) PCT Pub. No.: WO2020/042262
PCT Pub. Date: Mar. 5, 2020

(65) Prior Publication Data
US 2021/0224520 A1  Jul. 22, 2021

(30) Foreign Application Priority Data
Aug. 30, 2018 (CN) .......................... 201810999081.9

(51) Int. Cl.
*G06K 9/00* (2006.01)
*G09G 3/36* (2006.01)

(52) U.S. Cl.
CPC ....... *G06K 9/00288* (2013.01); *G09G 3/3607* (2013.01); *G09G 3/3696* (2013.01); *G09G 2300/0443* (2013.01); *G09G 2320/0666* (2013.01); *G09G 2360/14* (2013.01)

(58) Field of Classification Search
CPC ............. G06K 9/00288; G09G 3/3607; G09G 3/3696; G09G 2300/0443; G09G 2320/0666; G09G 2360/14
See application file for complete search history.

(56) References Cited

U.S. PATENT DOCUMENTS

2016/0203305 A1* 7/2016 Suh .......................... G06F 21/32
382/118

FOREIGN PATENT DOCUMENTS

CN          107068730 A  *  8/2017

* cited by examiner

*Primary Examiner* — Kenneth B Lee, Jr.

(57) ABSTRACT

An in-cell facial recognition display panel, a method, and a liquid crystal display are disclosed. A facial recognition sub pixel is provided with a facial recognition module which is configured to capture a facial image. A display chip and facial recognition chip is arranged at one terminal of a non-display area. The display chip drives a panel display. The facial recognition chip drives the facial recognition sub pixel to capture the facial image. The present disclosure facilitates the design of a comprehensive screen, the improvement of the screen production yield, and the economy of the entire device.

13 Claims, 3 Drawing Sheets

IN-CELL FACIAL RECOGNITION DISPLAY PANEL, METHOD AND LIQUID CRYSTAL DISPLAY

BACKGROUND

1. Field of the Disclosure

The present disclosure relates to the display panel technology, and more particularly, to an in-cell facial recognition display panel, a method, and a liquid crystal display (LCD).

2. Description of the Related Art

With the development of the facial recognition technology, major cellphone manufacturers are deploying facial recognition. Facial recognition of the related art requires a separate facial recognition sensor, which occupies some space, so it is not conducive to full screen design. Embedding the facial recognition function into the liquid crystal panel is increasingly valued by panel manufacturing companies because of the low cost of manufacturing materials and the advantage of being more comprehensive screen design. A plan of the related art about the arrangement of a facial recognition sensor is to place the facial recognition sensor in a groove by digging grooves in the top of the screen.

Please refer to FIG. 1 illustrating a schematic diagram of a display panel of the related art. The display panel of the related art includes a display area 11 and a non-display area 12. A display chip 121 is disposed at one terminal of the non-display area 12. The display chip 121 drives the display panel to operate normally. Pixels 111 are disposed in the display area 11. Each of the pixels 111 includes an R sub pixel (Sub Pixel R), a G sub pixel (Sub Pixel G), and a B sub pixel (Sub Pixel B). All of the pixels 111 are distributed throughout the display area 11 in an array.

The facial recognition method of the related art that a facial recognition sensor is arranged in a groove which is dug in the top of the screen has the disadvantage of affecting the appearance and failing to design a full screen. Besides, the design of screen trenching is difficult. The screen production yield and the yield rate may be lowered. The screen cost may increase. In addition, additional facial recognition devices also increase the cost of the entire device.

SUMMARY

An object of the present disclosure is to provide an in-cell facial recognition display panel, a method, and a liquid crystal display (LCD), which facilitates the design of a comprehensive screen, the improvement of the screen production yield, and the economy of the entire device.

According to a first aspect of the present disclosure, an in-cell facial recognition display panel comprises a display area and a non-display area. A plurality of pixels are distributed in an array in the display area. Each of the plurality of pixels comprises a red sub pixel, a green sub pixel, a blue sub pixel, and a facial recognition sub pixel. The facial recognition sub pixel is provided with a facial recognition module which is configured to capture a facial image. A display chip and facial recognition chip is arranged at one terminal of the non-display area. The display chip is separately connected to the red sub pixel, the green sub pixel, and the blue sub pixel, and configured to drive the red sub pixel, the green sub pixel, and the blue sub pixel to perform panel display. The facial recognition chip is connected to the facial recognition sub pixel and configured to drive the facial recognition sub pixel to capture the facial image.

According to a second aspect of the present disclosure, a panel display and facial recognition method performed by an in-cell facial recognition display panel is provided. The in-cell facial recognition display panel comprises a display area and a non-display area. A plurality of pixels are distributed in an array in the display area. Each of the plurality of pixels comprises a red sub pixel, a green sub pixel, a blue sub pixel, and a facial recognition sub pixel. The facial recognition sub pixel is provided with a facial recognition module which is configured to capture a facial image. A display chip and facial recognition chip is arranged at one terminal of the non-display area. The display chip is separately connected to the red sub pixel, the green sub pixel, and the blue sub pixel, and configured to drive the red sub pixel, the green sub pixel, and the blue sub pixel to perform panel display. The facial recognition chip is connected to the facial recognition sub pixel and configured to drive the facial recognition sub pixel to capture the facial image. The panel display and facial recognition method comprises: sequentially outputting a high voltage level to all scanning signal lines in the display panel to turn on thin film transistors (TFTs) which all red sub pixels, green sub pixels, blue sub pixels, and facial recognition sub pixels in corresponding rows correspond to; inputting display voltage imposed on the corresponding row with a display chip to the corresponding red sub pixel in the corresponding row through all first data signal lines; inputting the display voltage imposed on the corresponding row with the display chip to the corresponding green sub pixel in the corresponding row through all second data signal lines; inputting the display voltage imposed on the corresponding row with the display chip to the corresponding blue sub pixel in the corresponding row through all third data signal lines; and reading information about a facial image in the corresponding row with a facial recognition chip from the corresponding facial recognition sub pixel in the corresponding row through all fourth data signal lines.

According to a third aspect of the present disclosure, a liquid crystal display comprises an in-cell facial recognition display panel. The in-cell facial recognition display panel comprises a display area and a non-display area. A plurality of pixels are distributed in an array in the display area. Each of the plurality of pixels comprises a red sub pixel, a green sub pixel, a blue sub pixel, and a facial recognition sub pixel. The facial recognition sub pixel is provided with a facial recognition module which is configured to capture a facial image. A display chip and facial recognition chip is arranged at one terminal of the non-display area. The display chip is separately connected to the red sub pixel, the green sub pixel, and the blue sub pixel, and configured to drive the red sub pixel, the green sub pixel, and the blue sub pixel to perform panel display. The facial recognition chip is connected to the facial recognition sub pixel and configured to drive the facial recognition sub pixel to capture the facial image.

The disclosure has advantages as follows:

(1) It is not necessary to reserve grooves where a front camera and a facial recognition device are arranged on the display panel. In this way, the screen production yield is improved.

(2) It is good for designing the comprehensive screen better with the in-cell facial recognition method. In this way, the entire device is beautified.

(3) It is not necessary to use an additional front camera and an additional facial recognition device. In this way, the cost of the entire device lessens.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

Figure 1:
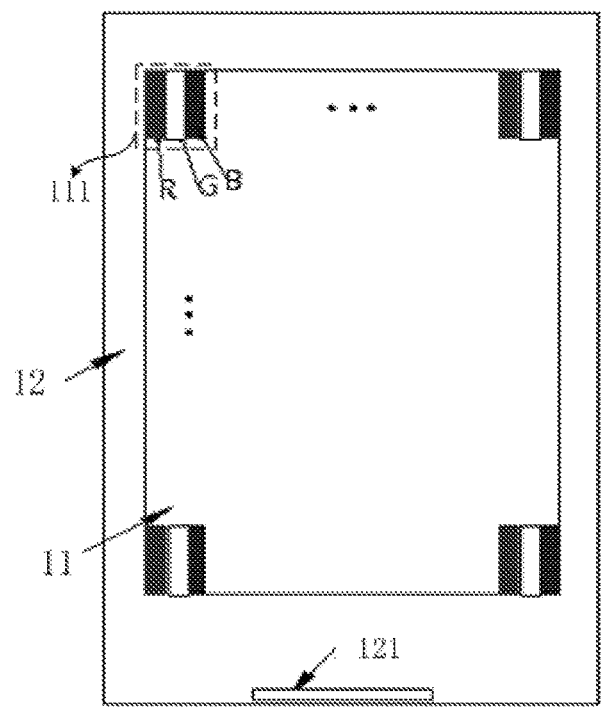
FIG. 1 illustrates a schematic diagram of a display panel of the related art.
Figure 2:
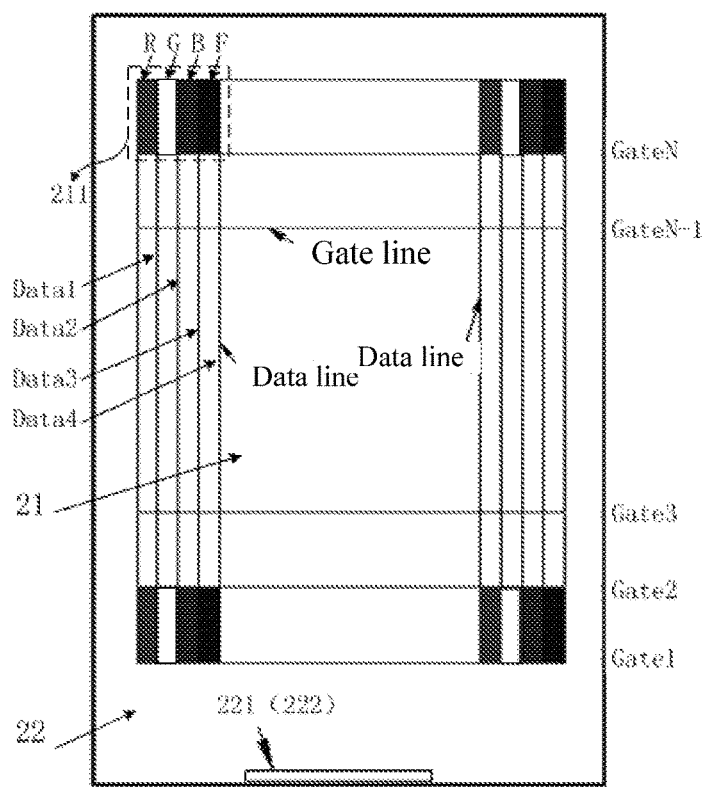
FIG. 2 illustrates a schematic diagram of an in-cell facial recognition display panel according to a first embodiment of the present disclosure.

Please refer to FIG. 2 illustrating a schematic diagram of an in-cell facial recognition display panel according to a first embodiment of the present disclosure. The in-cell facial recognition display panel includes a display area 21 and a non-display area 22. A plurality of pixels 211 are distributed in an array in the display area 21. Each of the plurality of pixels 211 includes a red (R) sub pixel, a green (G) sub pixel, a blue (B) sub pixel, and a facial recognition (F) sub pixel. The F sub pixel is provided with a facial recognition module. The facial recognition module is configured to capture facial images. One terminal of the non-display area 22 is provided with a display chip 221 and a facial recognition chip 222. The display chip 211 is connected to the R sub pixel, the G sub pixel, and the B sub pixel, and is configured to drive the R sub pixel, the G sub pixel, and the B sub pixel to perform panel display. The facial recognition chip 222 is connected to the F sub pixel and is configured to drive the F sub pixel to capture facial images.

The facial recognition module is fabricated in an additional F sub pixel (sub pixel F) and configured to capture facial images. At this time, each of the pixels (pixel) includes sub pixel R, sub pixel G, sub pixel B, and sub pixel F. The pixel array is distributed throughout the display area 21. A display chip and a facial recognition chip are disposed at one terminal of the non-display area 22. The display chip drives the display panel. The facial recognition chip drives the facial recognition module.

In another embodiment, a display chip 221 and a facial recognition chip 222 may be integrated in the same chip.

Specifically, the plurality of pixels 211 are arrayed in an array. The R sub pixels, the G sub pixels, the B sub pixels, and the F sub pixels in the same row are all connected to the same scanning signal line (Gate) through a corresponding thin film transistor (TFT). The R sub pixels in the same row are separately connected to a first data signal line Data1 and are connected to the display chip 221 through the first data signal line Data1. The G sub pixels in the same row are separately connected to a second data signal line Data2 and are connected to the display chip 221 through the second data signal line Data2. The B sub pixels in the same row are separately connected to a third data signal line Data3 and are connected to the display chip 221 through the third data signal line Data3. The F sub pixels in the same row are separately connected to a fourth data signal line Data4 and are connected to the facial recognition chip 222 through the fourth data signal line Data4. That is to say, in the in-cell facial recognition display panel, all of the pixels in the same row share a gate line, and each of the R, G, B, and F sub pixels has its own data line. The data lines of the R, G, and B sub pixels are connected to the display chip. The data lines of the F sub pixels are connected to the facial recognition chip.

In the plurality of pixels 211 in an array, the TFTs of all of the R sub pixels, the G sub pixels, the B sub pixels, and the F sub pixels in the same row are turned on upon being connected to the scanning signal line which outputs high voltage levels in the same row. The display chip 221 inputs display voltage in the corresponding row to the corresponding R sub pixel in the same row through all of the first data signal lines Data1, inputs the display voltage in the corresponding row to the corresponding G sub pixel in the same row through all of the second data signal lines Data2, and inputs the display voltage in the corresponding row to the corresponding B sub pixel in the same row through all of the third data signal lines Data3. The facial recognition chip 222 reads information about the facial images in the corresponding row from the corresponding F sub pixel in the same row through all of the fourth data signal lines. In other words, the Gate1 to GateN sequentially outputs high voltage levels (6V to 12V) to turn on the TFT of the pixel in the corresponding row. The remaining gate lines are still at low voltage levels (−9V to −7V) to turn off the TFT of the pixel in the corresponding row. The display chip connected to the data lines related to the R, G, B sub pixels in the corresponding rows feeds display voltage in the corresponding row into the data lines related to the R, G, B sub pixels in the corresponding rows. The facial recognition chip reads information about the correct facial images by accessing the data line related to the F sub pixel in the corresponding row.

Figure 3:
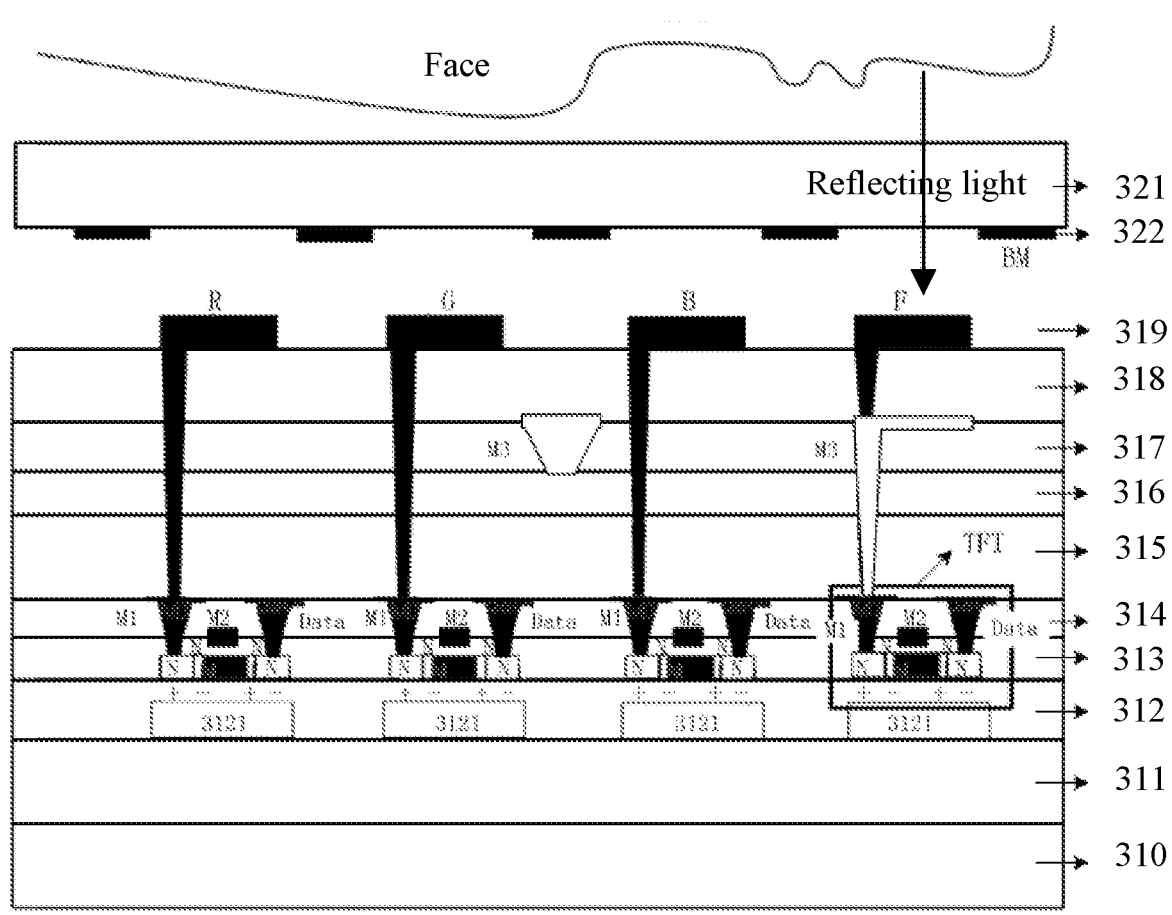
FIG. 3 illustrates a cross-sectional diagram of a second embodiment of an in-cell facial recognition display panel of the present disclosure.

Please refer to FIG. 3 illustrating a cross-sectional diagram of a second embodiment of an in-cell facial recognition display panel of the present disclosure. The in-cell facial recognition display panel includes a display area including a thin film transistor (TFT) array substrate and a color filter (CF) substrate disposed opposite to each other. The TFT array substrate includes a pixel electrode layer 319. All pixels are distributed on the pixel electrode layer 319 in an array. Each of the pixels includes an R sub pixel, a G sub pixel, a B sub pixel, and an F sub pixel (illustrated as reference numerals R, G, B, and F in FIG. 3) which are separately connected to a thin film transistor (TFT). Specifically, the TFT array substrate includes a backlight layer 310, a TFT glass substrate 311, an insulating layer 312, a gate insulating layer (GI) 313, a drain insulating layer (ILD) 314, an organic flat layer (PLN) 315, a common electrode layer (COM ITO) 316, a touch insulating layer (IL) 317, a display pixel insulating layer (PV) 318, and the pixel electrode layer 319, which are all layered on the TFT array substrate. All of the pixels are distributed on the pixel electrode layer 319 in an array. The CF substrate includes a CF glass substrate 321 and a black matrix (BM) 322 formed on the CF glass substrate 321. A third metallic layer M3 is deposited and patterned on the common electrode layer 316. All of the TFTs are formed on the insulating layer 312. Specifically, an N-type substrate (a gate of the TFT) is formed on the insulating layer 312 and covers the gate insulating layer 313. A first metallic layer M1 and a second metallic layer M2 are deposited on the gate insulating layer 313 and patterned to form a source and a drain of the TFT. The source of the TFT is connected to a corresponding sub pixel through a hole. The drain of the TFT is configured to be connected to a data line. A metallic light shielding layer 3121 is arranged on the insulating layer 312 at a position corresponding to all of the TFTs. The gate insulating layer (GI) 313 is configured to separate the second metallic layer M2 from the gate of TFT. The drain insulating layer (ILD) 314 is configured to separate the second metallic layer M2 from the first metallic layer M1. The organic flat layer (PLN) 315 includes a thicker flat layer which is configured to fill the unevenness formed by the lower TFT to facilitate fabrication the circuit on upper layers; The touch insulating layer (IL) 317 is configured to separate the third metallic layer M3 from the common electrode layer (COM ITO) 316. The touch insulating layer (IL) 317 needs to be punched at a place where the third metallic layer M3 needs to be connected to the common electrode layer (COM ITO) 316 to make the third metallic layer M3 contact the common electrode layer (COM ITO) 316. The display pixel insulating layer (PV) 318 is configured to separate the pixel electrode layer (Pixel ITO) from the third metallic layer M3.

A complementary metal-oxide-semiconductor (CMOS) photosensitive component or a charge coupled device (CCD) photosensitive component is integrated on each of the F sub pixels and configured to capture images. A three-color photosensitive component, a monochrome photosensitive component, or an infrared photosensitive component can be integrated on the F sub pixel. Images recognized by the monochrome photosensitive component is black-and-white images. It is not necessary to shine the face 39 with an external light source when the infrared light-sensing unit is used though facial recognition in a dull condition (for example, at night) is realized.

Take facial recognition of monochrome photosensitive component for example. The face 39 needs to be shined by an external light source, such as sunlight and indoor lighting while facial recognition is conducted. Take sunlight for example, the sunlight reflected by the face 39 is incident on the photosensitive component on the F sub pixel, and the photosensitive component responds, converting the intensity information of the reflected light into an electrical signal with corresponding intensity. The facial recognition chip senses an electrical signal which each of the F sub pixels corresponds to and converts the electrical signals into a facial image to capture facial images completely. Compared the acquired facial images with the pre-stored facial images, and if the same, the facial recognition passes; if not, the facial recognition fails. An F sub pixel with a facial recognition module can further be substituted for a front camera for picture taking.

In another embodiment, each F sub pixel is provided with a third metallic layer M3 under an orthographic projection on a thin film transistor (TFT) array substrate 31 for shielding to prevent direct illumination of the light in a backlight layer to each of the F sub pixels, thereby causing interference in facial recognition.

As for the in-cell facial recognition display panel proposed by the disclosure, it is necessary to reserve grooves where the front camera and the facial recognition device are placed, so the screen production yield of the in-cell facial recognition display panel is enhanced. Besides, the in-cell facial recognition method is beneficial to the design of the comprehensive screen, so the entire device is beautified. It is not necessary to use an additional front camera and an additional facial recognition device, so the cost of the entire device lessens.

The present disclosure further proposes a liquid crystal display (LCD). The LCD is equipped with a display panel which adopts the above-mentioned in-cell facial recognition display panel proposed by the present disclosure. Specifically, an in-cell facial recognition display panel comprises a display area and a non-display area. A plurality of pixels are distributed in an array in the display area. Each of the plurality of pixels comprises a red sub pixel, a green sub pixel, a blue sub pixel, and a facial recognition sub pixel. The facial recognition sub pixel is provided with a facial recognition module which is configured to capture a facial image. A display chip and facial recognition chip is arranged at one terminal of the non-display area. The display chip is separately connected to the red sub pixel, the green sub pixel, and the blue sub pixel, and configured to drive the red sub pixel, the green sub pixel, and the blue sub pixel to perform panel display. The facial recognition chip is connected to the facial recognition sub pixel and configured to drive the facial recognition sub pixel to capture the facial image.

The present disclosure further proposes a panel display and facial recognition method. The method is applied to the in-cell facial recognition display panel proposed by the present disclosure. The method includes blocks of sequentially outputting high voltage levels to all of the scanning signal lines in the display panel to turn on TFTs which all of the R sub pixels, the G sub pixels, the B sub pixels, and the F sub pixels in the corresponding rows correspond to. The display chip inputs the display voltage imposed on the corresponding row to the corresponding R sub pixel in the corresponding row through all of the first data signal lines. The display chip inputs the display voltage imposed on the corresponding row to the corresponding G sub pixel in the corresponding row through all of the second data signal lines. The display chip inputs the display voltage imposed on the corresponding row to the corresponding B sub pixel in the corresponding row through all of the third data signal lines. The facial recognition chip reads information about facial images in the corresponding row from the corresponding F sub pixel in the corresponding row through all of the fourth data signal lines.

The Gate1 to GateN (for example, Gate1920) sequentially outputs high voltage levels (6V to 12V) to turn on the TFTs of the pixels in the corresponding row. The remaining gate lines remain low voltage levels (−9V to −7V) to render the TFTs of the pixels in the corresponding row turn off. The display chip corrected to the data lines related to the R, G, B sub pixel in the corresponding rows feeds correct display voltage into the data lines related to the R, G, B sub pixel in the corresponding rows. The facial recognition chip reads information about the correct facial image by accessing the data line related to the F sub pixel in the corresponding row.

Figure 4:
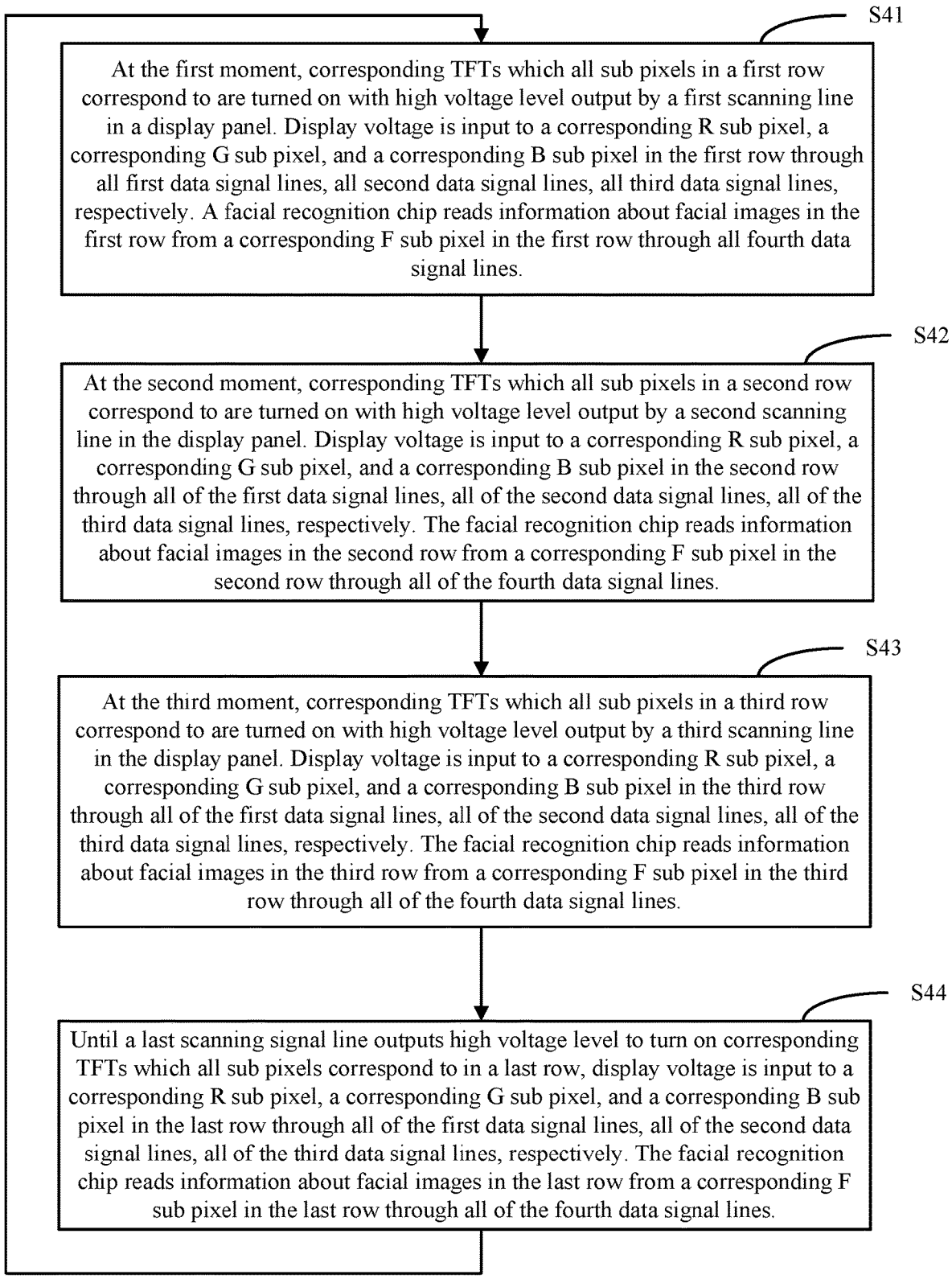
FIG. 4 illustrates a flowchart of panel display and facial recognition method according to a third embodiment of the present disclosure.

Please refer to FIG. 4 illustrating a flowchart of panel display and facial recognition method according to a third embodiment of the present disclosure. The method includes block S41, block S42, block S43, and block S44.

At block S41, at the first moment, corresponding thin film transistors (TFTs) which all sub pixels in a first row correspond to are turned on with high voltage level output by a first scanning line in a display panel. Display voltage is input to a corresponding R sub pixel, a corresponding G sub pixel, and a corresponding B sub pixel in the first row through all first data signal lines, all second data signal lines, all third data signal lines, respectively. A facial recognition chip reads information about facial images in the first row from a corresponding F sub pixel in the first row through all fourth data signal lines.

At block S42, at the second moment, corresponding TFTs which all sub pixels in a second row correspond to are turned on with high voltage level output by a second scanning line in the display panel. Display voltage is input to a corresponding R sub pixel, a corresponding G sub pixel, and a corresponding B sub pixel in the second row through all of the first data signal lines, all of the second data signal lines, all of the third data signal lines, respectively. The facial recognition chip reads information about facial images in the second row from a corresponding F sub pixel in the second row through all of the fourth data signal lines.

At block S43, at the third moment, corresponding TFTs which all sub pixels in a third row correspond to are turned on with high voltage level output by a third scanning line in the display panel. Display voltage is input to a corresponding R sub pixel, a corresponding G sub pixel, and a corresponding B sub pixel in the third row through all of the first data signal lines, all of the second data signal lines, all of the third data signal lines, respectively. The facial recognition chip reads information about facial images in the third row from a corresponding F sub pixel in the third row through all of the fourth data signal lines.

At block S44, the blocks will not finish until a last scanning signal line outputs high voltage level to turn on corresponding TFTs which all sub pixels correspond to in a last row. Display voltage is input to a corresponding R sub pixel, a corresponding G sub pixel, and a corresponding B sub pixel in the last row through all of the first data signal lines, all of the second data signal lines, all of the third data signal lines, respectively. The facial recognition chip reads information about facial images in the last row from a corresponding F sub pixel in the last row through all of the fourth data signal lines. Then, go back to block S41.

The specific working process of the panel display and facial recognition method according to the present disclosure will be described below by taking N=1920 as an example.

1) At the first moment, Gate1 outputs a high voltage level to turn on corresponding thin film transistors (TFTs) which all sub pixels correspond to in a first row. Gate2 to Gate1920 output low voltage levels to turn off corresponding TFTs which all of the sub pixels in the other rows correspond to. At this time, a display chip feeds display voltage into all of the sub pixels in the first row through data lines related to the R, G, B sub pixels. The facial recognition chip reads the information about facial images in the first row through a data line related to an F sub pixel.

2) At the second moment, Gate2 outputs a high voltage level to turn on corresponding TFTs which all sub pixels correspond to in a second row. Gate1 and Gate3 to Gate1920 output low voltage levels to turn off corresponding TFTs which all of the sub pixels in the other rows correspond to. At this time, the display chip feeds display voltage into all of the sub pixels in the second row through the data lines related to the R, G, B sub pixels. The facial recognition chip reads the information about facial images in the second row through the data line related to the F sub pixel.

3) At the third moment, Gate3 outputs a high voltage level to turn on corresponding TFTs which all sub pixels correspond to in a third row. Gate1 to Gate2 and Gate4 to Gate1920 output low voltage levels to turn off corresponding TFTs which all of the sub pixels in the other rows correspond to. At this time, the display chip feeds display voltage into all of the sub pixels in the third row through the data lines related to the R, G, B sub pixels. The facial recognition chip reads the information about facial images in the third row through the data line related to the F sub pixel.

4) The working process will not finish until Gate1920 outputs a high voltage level to turn on corresponding TFTs which all sub pixels correspond to in a 1920th row. Gate1 to Gate1919 output low voltage levels to turn off corresponding TFTs which all of the sub pixels in the other rows correspond to. At this time, the display chip feeds display voltage into all of the sub pixels in the 1920th row through the data lines related to the R, G, B sub pixels. The facial recognition chip reads the information about facial images in the 1920th row through the data line related to the F sub pixel.

Go back to block 1, and repeat block 1 to block 4 again and again.

The above texts are merely specific embodiments of the present disclosure. However, the scope of the present disclosure is not limited hereto. Any variations or alternatives that can easily be thought of by technicians familiar with the field should fall within the scope of the present disclosure. Therefore, the scope of the present disclosure should be defined by the scope of the claims.

What is claimed is:

1. An in-cell facial recognition display panel, comprising a display area and a non-display area wherein
a plurality of pixels are distributed in an array in the display area; each of the plurality of pixels comprises a red sub pixel, a green sub pixel, a blue sub pixel, and a facial recognition sub pixel; the facial recognition sub pixel is provided with a facial recognition module which is configured to capture a facial image;
a display chip and facial recognition chip is arranged at one terminal of the non-display area;
the display chip is separately connected to the red sub pixel, the green sub pixel, and the blue sub pixel, and configured to drive the red sub pixel, the green sub pixel, and the blue sub pixel to perform panel display;
the facial recognition chip is connected to the facial recognition sub pixel and configured to drive the facial recognition sub pixel to capture the facial image,
wherein the red sub pixels, the green sub pixels, the blue sub pixels, and the facial recognition sub pixels in the same row are all connected to the same scanning signal line through a corresponding thin film transistor (TFT);
the red sub pixels in the same row are separately connected to a first data signal line and receive the display chip through the first data signal line;
the green sub pixels in the same row are separately connected to a second data signal line and are connected to the display chip through the second data signal line;
the blue sub pixels in the same row are separately connected to a third data signal line and are connected to the display chip through the third data signal line;
the facial recognition sub pixels in the same row are separately connected to a fourth data signal line and are connected to the facial recognition chip through the fourth data signal line.

2. The in-cell facial recognition display panel of claim 1, wherein the TFTs of all of the red sub pixels, the green sub pixels, the blue sub pixels, and the facial recognition sub pixels in the same row are turned on upon being connected to the scanning signal line which outputs a high voltage level in the same row;
the display chip inputs display voltage in the corresponding row to the corresponding red sub pixel in the same row through all of the first data signal lines, inputs the display voltage in the corresponding row to the corresponding green sub pixel in the same row through all of the second data signal lines, and inputs the display voltage in the corresponding row to the corresponding blue sub pixel in the same row through all of the third data signal lines;
the facial recognition chip reads information about the facial image in the corresponding row from the corresponding facial recognition sub pixel in the same row through all of the fourth data signal lines.

3. The in-cell facial recognition display panel of claim 1, wherein the display area comprises a TFT array substrate and a color filter (CF) substrate disposed opposite to each other; the TFT array substrate comprises a pixel electrode layer; all of the pixels are distributed on the pixel electrode layer in an array; each of the pixels comprises a red sub pixel, a green sub pixel, a blue sub pixel, and a facial recognition sub pixel which are separately connected to a TFT.

4. The in-cell facial recognition display panel of claim 3, wherein a complementary metal-oxide-semiconductor (CMOS) photosensitive component or a charge coupled device (CCD) photosensitive component is integrated on each of the facial recognition sub pixels.

5. The in-cell facial recognition display panel of claim 3, wherein a three-color photosensitive component, a monochrome photosensitive component, or an infrared photosensitive component is integrated on each of the facial recognition sub pixels.

6. The in-cell facial recognition display panel of claim 3, wherein each of the facial recognition sub pixels is provided with a third metallic layer under an orthographic projection on the TFT array substrate.

7. A panel display and facial recognition method performed by an in-cell facial recognition display panel, wherein the in-cell facial recognition display panel comprises a display area and a non-display area, wherein a plurality of pixels are distributed in an array in the display area; each of the plurality of pixels comprises a red sub pixel, a green sub pixel, a blue sub pixel, and a facial recognition sub pixel; the facial recognition sub pixel is provided with a facial recognition module which is configured to capture a facial image; a display chip and facial recognition chip is arranged at one terminal of the non-display area; the display chip is separately connected to the red sub pixel, the green sub pixel, and the blue sub pixel, and configured to drive the red sub pixel, the green sub pixel, and the blue sub pixel to perform panel display; the facial recognition chip is connected to the facial recognition sub pixel and configured to drive the facial recognition sub pixel to capture the facial image; wherein the panel display and facial recognition method comprises:
sequentially outputting a high voltage level to all scanning signal lines in the display panel to turn on thin film transistors (TFTs) which all red sub pixels, green sub pixels, blue sub pixels, and facial recognition sub pixels in corresponding rows correspond to;
inputting display voltage imposed on the corresponding row with a display chip to the corresponding red sub pixel in the corresponding row through all first data signal lines; inputting the display voltage imposed on the corresponding row with the display chip to the corresponding green sub pixel in the corresponding row through all second data signal lines; inputting the display voltage imposed on the corresponding row with the display chip to the corresponding blue sub pixel in the corresponding row through all third data signal lines; and
reading information about a facial image in the corresponding row with a facial recognition chip from the corresponding facial recognition sub pixel in the corresponding row through all fourth data signal lines.

8. The panel display and facial recognition method of claim 7, further comprising:
(a) at a first moment, turning on corresponding thin film transistors (TFTs) which all sub pixels in a first row correspond to with high voltage level output by a first scanning line in a display panel; inputting display voltage to a corresponding red sub pixel, a corresponding green sub pixel, and a corresponding blue sub pixel in the first row through all first data signal lines, all second data signal lines, all third data signal lines, respectively; reading information about a facial image in the first row from a corresponding facial recognition sub pixel in the first row with a facial recognition chip through all fourth data signal lines;

(b) at a second moment, turning on corresponding TFTs which all sub pixels in a second row correspond to with high voltage level output by a second scanning line in the display panel;
inputting the display voltage to a corresponding red sub pixel, a corresponding green sub pixel, and a corresponding blue sub pixel in the second row through all of the first data signal lines, all of the second data signal lines, all of the third data signal lines, respectively; reading information about a facial image in the second row from a corresponding facial recognition sub pixel in the second row with the facial recognition chip through all of the fourth data signal lines;
(c) at a third moment, turning on corresponding TFTs which all sub pixels in a third row correspond to with high voltage level output by a third scanning line in the display panel; inputting the display voltage to a corresponding red sub pixel, a corresponding green sub pixel, and a corresponding blue sub pixel in the third row through all of the first data signal lines, all of the second data signal lines, all of the third data signal lines, respectively; reading information about a facial image in the third row from a corresponding facial recognition sub pixel in the third row with the facial recognition chip through all of the fourth data signal lines;
(d) continuing the blocks until a last scanning signal line outputs high voltage level to turn on corresponding TFTs which all sub pixels correspond to in a last row; inputting the display voltage to a corresponding red sub pixel, a corresponding green sub pixel, and a corresponding blue sub pixel in the last row through all of the first data signal lines, all of the second data signal lines, all of the third data signal lines, respectively; reading information about a facial image in the last row from a corresponding facial recognition sub pixel in the last row with the facial recognition chip through all of the fourth data signal lines; afterwards, going back to step (a).

9. An in-cell facial recognition display panel, comprising a display area and a non-display area wherein
a plurality of pixels are distributed in an array in the display area; each of the plurality of pixels comprises a red sub pixel, a green sub pixel, a blue sub pixel, and a facial recognition sub pixel; the facial recognition sub pixel is provided with a facial recognition module which is configured to capture a facial image;
a display chip and facial recognition chip is arranged at one terminal of the non-display area;
the display chip is separately connected to the red sub pixel, the green sub pixel, and the blue sub pixel, and configured to drive the red sub pixel, the green sub pixel, and the blue sub pixel to perform panel display;
the facial recognition chip is connected to the facial recognition sub pixel and configured to drive the facial recognition sub pixel to capture the facial image; and
the display area comprises a TFT array substrate and a color filter (CF) substrate disposed opposite to each other; the TFT array substrate comprises a pixel electrode layer; all of the pixels are distributed on the pixel electrode layer in an array; each of the pixels comprises a red sub pixel, a green sub pixel, a blue sub pixel, and a facial recognition sub pixel which are separately connected to a TFT.

10. The in-cell facial recognition display panel of claim 9, wherein the TFTs of all of the red sub pixels, the green sub pixels, the blue sub pixels, and the facial recognition sub pixels in the same row are turned on upon being connected to the scanning signal line which outputs a high voltage level in the same row;
the display chip inputs display voltage in the corresponding row to the corresponding red sub pixel in the same row through all of the first data signal lines, inputs the display voltage in the corresponding row to the corresponding green sub pixel in the same row through all of the second data signal lines, and inputs the display voltage in the corresponding row to the corresponding blue sub pixel in the same row through all of the third data signal lines;
the facial recognition chip reads information about the facial image in the corresponding row from the corresponding facial recognition sub pixel in the same row through all of the fourth data signal lines.

11. The in-cell facial recognition display panel of claim 3, wherein a complementary metal-oxide-semiconductor (CMOS) photosensitive component or a charge coupled device (CCD) photosensitive component is integrated on each of the facial recognition sub pixels.

12. The in-cell facial recognition display panel of claim 3, wherein a three-color photosensitive component, a monochrome photosensitive component, or an infrared photosensitive component is integrated on each of the facial recognition sub pixels.

13. The in-cell facial recognition display panel of claim 3, wherein each of the facial recognition sub pixels is provided with a third metallic layer under an orthographic projection on the TFT array substrate.

* * * * *